US012321914B2

United States Patent
Ma et al.

(10) Patent No.: US 12,321,914 B2
(45) Date of Patent: *Jun. 3, 2025

(54) SYSTEM, METHOD, AND APPARATUS FOR PROCESSING CUSTOMER RECURRENCE DATA FOR TRANSACTIONS

(71) Applicant: Visa International Service Association, San Francisco, CA (US)

(72) Inventors: Gwen Diane Ma, Belmont, CA (US); Steven David Cracknell, San Mateo, CA (US); Laura Angevine Long, San Mateo, CA (US); Michele Lauren Banks Larsen, Ellicott City, MD (US); Mary Taylor, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/947,239

(22) Filed: Sep. 19, 2022

(65) Prior Publication Data
US 2023/0018754 A1  Jan. 19, 2023

Related U.S. Application Data

(63) Continuation of application No. 16/603,726, filed as application No. PCT/US2017/027143 on Apr. 12, 2017, now Pat. No. 11,481,747.

(51) Int. Cl.
*G06Q 20/20* (2012.01)

(52) U.S. Cl.
CPC ........... *G06Q 20/202* (2013.01); *G06Q 20/20* (2013.01)

(58) Field of Classification Search
None
See application file for complete search history.

(56) References Cited

U.S. PATENT DOCUMENTS

| | | |
|---|---|---|
| 6,442,532 B1 | 8/2002 | Kawan |
| 7,650,314 B1 | 1/2010 | Saunders |
| 9,576,294 B2 | 2/2017 | Gebb et al. |
| 9,959,529 B1 * | 5/2018 | Varma ............... G06Q 20/40 |
| 10,217,133 B2 * | 2/2019 | Ellison ............ G06Q 30/0261 |
| 10,397,348 B2 | 8/2019 | Ma et al. |
| 10,510,073 B2 | 12/2019 | Wong et al. |
| 11,051,220 B1 | 6/2021 | Song et al. |
| 2002/0165778 A1 * | 11/2002 | O'Hagan ........... G06Q 30/0601 705/14.34 |
| 2003/0069828 A1 | 4/2003 | Blazey et al. |
| 2003/0144955 A1 | 7/2003 | Kim |
| 2005/0149544 A1 | 7/2005 | Bishop et al. |
| 2005/0269398 A1 | 12/2005 | Robinson et al. |
| 2006/0229996 A1 | 10/2006 | Keithley et al. |
| 2008/0133351 A1 | 6/2008 | White et al. |
| 2009/0063331 A1 | 3/2009 | Rodin |

(Continued)

FOREIGN PATENT DOCUMENTS

| | | |
|---|---|---|
| KR | 1020080030254 A | 4/2008 |
| KR | 1020150030141 A | 3/2015 |
| WO | 2016097718 A1 | 6/2016 |

*Primary Examiner* — Fateh M Obaid
(74) *Attorney, Agent, or Firm* — The Webb Law Firm

(57) ABSTRACT

Systems, methods, and apparatuses for implementing, managing, controlling, or otherwise processing customer recurrence data for transactions, such as a transaction between a customer and a resource provider, e.g., a merchant.

17 Claims, 9 Drawing Sheets

(56) References Cited

U.S. PATENT DOCUMENTS

| | | |
|---|---|---|
| 2010/0250338 A1 | 9/2010 | Banerjee et al. |
| 2011/0202516 A1 | 8/2011 | Rugg et al. |
| 2011/0238575 A1 | 9/2011 | Nightengale et al. |
| 2012/0179532 A1 | 7/2012 | Vermander |
| 2012/0226545 A1 | 9/2012 | Gebb et al. |
| 2013/0103482 A1* | 4/2013 | Song .................. G06Q 30/02 705/14.26 |
| 2013/0282461 A1 | 10/2013 | Ovick et al. |
| 2013/0290121 A1 | 10/2013 | Simakov et al. |
| 2013/0304555 A1 | 11/2013 | Groarke |
| 2014/0188586 A1 | 7/2014 | Carpenter et al. |
| 2015/0066742 A1* | 3/2015 | Chatterton ......... G06Q 20/3224 705/39 |
| 2015/0134421 A1 | 5/2015 | Dupont |
| 2015/0287067 A1 | 10/2015 | Robeen |
| 2015/0332302 A1 | 11/2015 | Celikyilmaz et al. |
| 2016/0034550 A1 | 2/2016 | Ostler et al. |
| 2016/0226837 A1 | 8/2016 | Kim |
| 2017/0278094 A1 | 9/2017 | Mackie |
| 2019/0057400 A1* | 2/2019 | Nair .................. G06Q 20/20 |
| 2021/0195384 A1 | 6/2021 | Spirko et al. |
| 2021/0204093 A1 | 7/2021 | D'Angelo et al. |

\* cited by examiner

SYSTEM, METHOD, AND APPARATUS FOR PROCESSING CUSTOMER RECURRENCE DATA FOR TRANSACTIONS

CROSS-REFERENCE TO RELATED APPLICATIONS

This application is a continuation application of U.S. patent application Ser. No. 16/603,726 filed Apr. 12, 2017, which is the United States national phase of International Application No. PCT/US2017/027143 filed Apr. 12, 2017 the disclosures of which are hereby incorporated by reference in their entireties.

BACKGROUND

1. Technical Field

This disclosure relates generally to transactional and payment systems and, in one particular embodiment, to a system, method, and apparatus for processing customer recurrence data for transactions.

2. Technical Considerations

Resource providers, such as merchants, provide goods, services, and other resources to consumers and customers. In order to improve the quality of their offerings and generate repeat customers, many of the resource providers implement or manage a customer recurrence program. Normally, such a customer recurrence program takes into consideration: (i) whether the customer is a first-time customer with the merchant; (ii) the frequency of transactions between the merchant and the customer; (iii) the time between transactions; (iv) the customer's pattern of transactions; (v) the value of the goods, services, or resources provided to the customer in the current or previous transactions; and/or the like. Based upon specified recurrence data or rules of the customer recurrence program, the merchant will offer or provide some benefit to the customer, such as a special offer for goods, services, or resources, a discount on the current or future transactions, a gift, and/or the like. In this manner, the merchant will engender goodwill with the customer and the chance that the customer uses (or recommend that others use) the merchant in the future increases.

However, one technical issue that arises in connection with many customer recurrence programs is the logistics of implementing and managing the program on a transaction-by-transaction basis and across multiple, interacting platforms and systems. Merchants may have one or more brick-and-mortar locations, one or more online locations, e.g., website or other electronic interfaces, or even "travelling" or moving locations, e.g., food trucks, drivers, etc. Accordingly, in many applications, the merchant is unable to effectively implement, track, and otherwise manage such a customer recurrence program. Even larger merchants may not employ the required personnel or wish to dedicate their resources or systems to manage and control their own customer recurrence program. Further, even if the merchant does maintain a customer recurrence program, the required hardware or systems with access to the customer recurrence data may not be located at or immediately accessible by the point-of-sale system. Still further, the benefit provided to the customer by the merchant may entail modifying the transaction value, such as in the form of a discount, which may then involve the transaction processing system and/or the authorizing entity, e.g., a bank.

Accordingly, there is a need in the technological arts for providing systems, methods, and apparatuses for implementing, managing, controlling, or otherwise processing customer recurrence data for transactions, such as a transaction between a customer and a resource provider, e.g., a merchant.

SUMMARY

Accordingly, and generally, provided is a system, method, and apparatus for processing customer recurrence data. Preferably, provided is a system, method, and apparatus for processing customer recurrence data for a plurality of customer recurrence programs for a plurality of merchants. Preferably, provided is a system, method, and apparatus for processing customer recurrence data that provides specified customer recurrence data to the merchant at the point-of-sale. Preferably, provided is a system, method, and apparatus for processing customer recurrence data that adjusts the transaction value or issues instructions to the point-of-sale system of the merchant.

According to some non-limiting embodiments or aspects, provided is a computer-implemented method comprising: receiving an account identifier of a customer via at least one graphical user interface displayed on a customer device; communicating the account identifier to at least one server computer from the customer device via a customer application programming interface; generating, on the at least one graphical user interface of the customer device, a display comprising a plurality of merchants associated with a plurality of customer recurrence programs corresponding to the account identifier; and in response to selection of a selectable option on the at least one graphical user interface, opting-in to a card instance program corresponding with at least a subset of the plurality of merchants by causing the at least one server computer to associate the account identifier with each merchant of the at least a subset of merchants in a database.

In some non-limiting embodiments or aspects, display comprising the plurality of merchants is based on customer recurrence program data communicated from the at least one server to the customer device. The display is generated based at least partially on at least one of the following: the location of the merchant, the location of the customer, customer data, transaction data, merchant data, or any combination thereof.

In some non-limiting embodiments or aspects, the method further comprises: generating, on the at least one graphical user interface of the customer device, a display comprising a map interface comprising at least one merchant of the plurality of merchants displayed in a geographic area based on proximity to the customer device.

In some non-limiting embodiments or aspects, the method further comprises: generating a plurality of selectable options on at least one merchant graphical user interface on a merchant device; receiving rule data associated with a customer recurrence program of the merchant via the plurality of selectable options; and communicating the rule data to the at least one server computer from the merchant device via a merchant application programming interface.

In some non-limiting embodiments or aspects, the at least one merchant graphical user interface comprises a plurality of templates of customer recurrence programs, and wherein the rule data is based on a selected template from the plurality of templates.

In some non-limiting embodiments or aspects, the method further comprises: generating, on the at least one graphical user interface of the customer device, a display comprising at least the subset of the plurality of merchants associated with account identifier in response to selection of opting-in to the card instance program.

In some non-limiting embodiments or aspects, provided is a system for implementing a method comprising at least one processor in communication with a server comprising: at least one processor programmed or configured to: receive an account identifier of a customer via at least one graphical user interface displayed on a customer device; communicate the account identifier to at least one server computer from the customer device via a customer application programming interface; generate, on the at least one graphical user interface of the customer device, a display comprising a plurality of merchants associated with a plurality of customer recurrence programs corresponding to the account identifier; and in response to selection of a selectable option on the at least one graphical user interface, opt-in to a card instance program corresponding with at least a subset of the plurality of merchants by causing the at least one server computer to associate the account identifier with each merchant of the at least a subset of merchants in a database.

In some non-limiting embodiments or aspects, the display comprising the plurality of merchants is based on customer recurrence program data communicated from the at least one server to the customer device.

In some non-limiting embodiments or aspects, the display is generated based at least partially on at least one of the following: the location of the merchant, the location of the customer, customer data, transaction data, merchant data, or any combination thereof.

In some non-limiting embodiments or aspects, the at least one processor of the system is further programmed or configured to: generate, on the at least one graphical user interface of the customer device, a display comprising a map interface comprising at least one merchant of the plurality of merchants displayed in a geographic area based on proximity to the customer device.

In some non-limiting embodiments or aspects, the system further comprises: at least one second processor programmed or configured to: generate a plurality of selectable options on at least one merchant graphical user interface on a merchant device; receive rule data associated with a customer recurrence program of the merchant via the plurality of selectable options; and communicate the rule data to the at least one server computer from the merchant device via a merchant application programming interface.

In some non-limiting embodiments or aspects, the at least one merchant graphical user interface comprises a plurality of templates of customer recurrence programs, and wherein the rule data is based on a selected template from the plurality of templates.

In some non-limiting embodiments or aspects, the at least one processor is programmed or configured to: generate, on the at least one graphical user interface of the customer device, a display comprising at least the subset of the plurality of merchants associated with account identifier in response to selection of opting-in to a card instance program.

In some non-limiting embodiments or aspects, provided is a computer program product comprising at least one non-transitory computer-readable medium having program instructions stored thereon, which, when executed by at least one processor, causes the at least one processor to: receive an account identifier of a customer via at least one graphical user interface displayed on a customer device; communicate the account identifier to at least one server computer from the customer device via a customer application programming interface; generate, on the at least one graphical user interface of the customer device, a display comprising a plurality of merchants associated with a plurality of customer recurrence programs corresponding to the account identifier; and in response to selection of a selectable option on the at least one graphical user interface, opt-in to a card instance program corresponding with at least a subset of the plurality of merchants by causing the at least one server computer to associate the account identifier with each merchant of the at least a subset of merchants in a database.

In some non-limiting embodiments or aspects, the display comprising the plurality of merchants is based on customer recurrence program data communicated from the at least one server to the customer device.

In some non-limiting embodiments or aspects, the display is generated based at least partially on at least one of the following: the location of the merchant, the location of the customer, customer data, transaction data, merchant data, or any combination thereof.

In some non-limiting embodiments or aspects, the program instructions, when executed by the at least processor, further cause the at least one processor to: generate, on the at least one graphical user interface of the customer device, a display comprising a map interface comprising at least one merchant of the plurality of merchants displayed in a geographic area based on proximity to the customer device.

In some non-limiting embodiments or aspects, the computer program product further comprises at least one second computer-readable medium having program instructions stored thereon, which, when executed by at least one second processor, causes the at least one second processor to: generate a plurality of selectable options on at least one merchant graphical user interface on a merchant device; receive rule data associated with a customer recurrence program of the merchant via the plurality of selectable options; and communicate the rule data to the at least one server computer from the merchant device via a merchant application programming interface.

In some non-limiting embodiments or aspects, the at least one merchant graphical user interface comprises a plurality of templates of customer recurrence programs, and wherein the rule data is based on a selected template from the plurality of templates.

Further non-limiting embodiments or aspects will now be set forth in the following numbered clauses.

Clause 1. A computer-implemented method comprising: receiving an account identifier of a customer via at least one graphical user interface displayed on a customer device; communicating the account identifier to at least one server computer from the customer device via a customer application programming interface; generating, on the at least one graphical user interface of the customer device, a display comprising a plurality of merchants associated with a plurality of customer recurrence programs corresponding to the account identifier; and in response to selection of a selectable option on the at least one graphical user interface, opting-in to a card instance program corresponding with at least a subset of the plurality of merchants by causing the at least one server computer to associate the account identifier with each merchant of the at least a subset of merchants in a database Clause 2. The computer-implemented method of clause 1, wherein the display comprising the plurality of merchants is based on customer recurrence program data communicated from the at least one server to the customer device Clause 3. The computer-implemented method of clause 1 or 2, wherein the display is generated based at least partially on at least one of the following: the location of the merchant, the location of the customer, customer data, transaction data, merchant data, or any combination thereof.

Clause 4. The computer-implemented method of any of clauses 1-3, further comprising: generating, on the at least one graphical user interface of the customer device, a display comprising a map interface comprising at least one merchant of the plurality of merchants displayed in a geographic area based on proximity to the customer device.

Clause 5. The computer-implemented method of any of clauses 1-4, further comprising: generating a plurality of selectable options on at least one merchant graphical user interface on a merchant device; receiving rule data associated with a customer recurrence program of the merchant via the plurality of selectable options; and communicating the rule data to the at least one server computer from the merchant device via a merchant application programming interface Clause 6. The computer-implemented method of any of clauses 1-5, wherein the at least one merchant graphical user interface comprises a plurality of templates of customer recurrence programs, and wherein the rule data is based on a selected template from the plurality of templates.

Clause 7. The computer-implemented method of any of clauses 1-6, further comprising: generating, on the at least one graphical user interface of the customer device, a display comprising at least the subset of the plurality of merchants associated with account identifier in response to selection of opting-in to the card instance program.

Clause 8. A system for implementing a method comprising at least one processor in communication with a server comprising: at least one processor programmed or configured to: receive an account identifier of a customer via at least one graphical user interface displayed on a customer device; communicate the account identifier to at least one server computer from the customer device via a customer application programming interface; generate, on the at least one graphical user interface of the customer device, a display comprising a plurality of merchants associated with a plurality of customer recurrence programs corresponding to the account identifier; and in response to selection of a selectable option on the at least one graphical user interface, opt-in to a card instance program corresponding with at least a subset of the plurality of merchants by causing the at least one server computer to associate the account identifier with each merchant of the at least a subset of merchants in a database.

Clause 9. The system of clause 8, wherein the display comprising the plurality of merchants is based on customer recurrence program data communicated from the at least one server to the customer device.

Clause 10. The system of clause 8 or 9, wherein the display is generated based at least partially on at least one of the following: the location of the merchant, the location of the customer, customer data, transaction data, merchant data, or any combination thereof.

Clause 11. The system of any of clauses 8-10, the at least one processor further programmed or configured to: generate, on the at least one graphical user interface of the customer device, a display comprising a map interface comprising at least one merchant of the plurality of merchants displayed in a geographic area based on proximity to the customer device.

Clause 12. The system of any of clauses 8-11 further comprising: at least one second processor programmed or configured to: generate a plurality of selectable options on at least one merchant graphical user interface on a merchant device; receive rule data associated with a customer recurrence program of the merchant via the plurality of selectable options; and communicate the rule data to the at least one server computer from the merchant device via a merchant application programming interface.

Clause 13. The system of any of clauses 8-12, wherein the at least one merchant graphical user interface comprises a plurality of templates of customer recurrence programs, and wherein the rule data is based on a selected template from the plurality of templates.

Clause 14. The system of any of clauses 8-13, the at least one processor programmed or configured to: generate, on the at least one graphical user interface of the customer device, a display comprising at least the subset of the plurality of merchants associated with account identifier in response to selection of opting-in to a card instance program.

Clause 15. A computer program product comprising at least one non-transitory computer-readable medium having program instructions stored thereon, which, when executed by at least one processor, causes the at least one processor to: receive an account identifier of a customer via at least one graphical user interface displayed on a customer device; communicate the account identifier to at least one server computer from the customer device via a customer application programming interface; generate, on the at least one graphical user interface of the customer device, a display comprising a plurality of merchants associated with a plurality of customer recurrence programs corresponding to the account identifier; and in response to selection of a selectable option on the at least one graphical user interface, opt-in to a card instance program corresponding with at least a subset of the plurality of merchants by causing the at least one server computer to associate the account identifier with each merchant of the at least a subset of merchants in a database.

Clause 16. The computer program product of clause 15, wherein the display comprising the plurality of merchants is based on customer recurrence program data communicated from the at least one server to the customer device.

Clause 17. The computer program product of clause 15 or 16, wherein the display is generated based at least partially on at least one of the following: the location of the merchant, the location of the customer, customer data, transaction data, merchant data, or any combination thereof.

Clause 18. The computer program product of any of clauses 15-17, wherein the program instructions, when executed by the at least processor, further cause the at least one processor to: generate, on the at least one graphical user interface of the customer device, a display comprising a map interface comprising at least one merchant of the plurality of merchants displayed in a geographic area based on proximity to the customer device.

Clause 19. The computer program product of any of clauses 15-18, further comprising at least one second computer-readable medium having program instructions stored thereon, which, when executed by at least one second processor, causes the at least one second processor to: generate a plurality of selectable options on at least one merchant graphical user interface on a merchant device; receive rule data associated with a customer recurrence program of the merchant via the plurality of selectable options; and communicate the rule data to the at least one server computer from the merchant device via a merchant application programming interface Clause 20. The computer program product of any of clauses 15-19, wherein the at least one merchant graphical user interface comprises a plurality of templates of customer recurrence programs, and wherein the rule data is based on a selected template from the plurality of templates.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
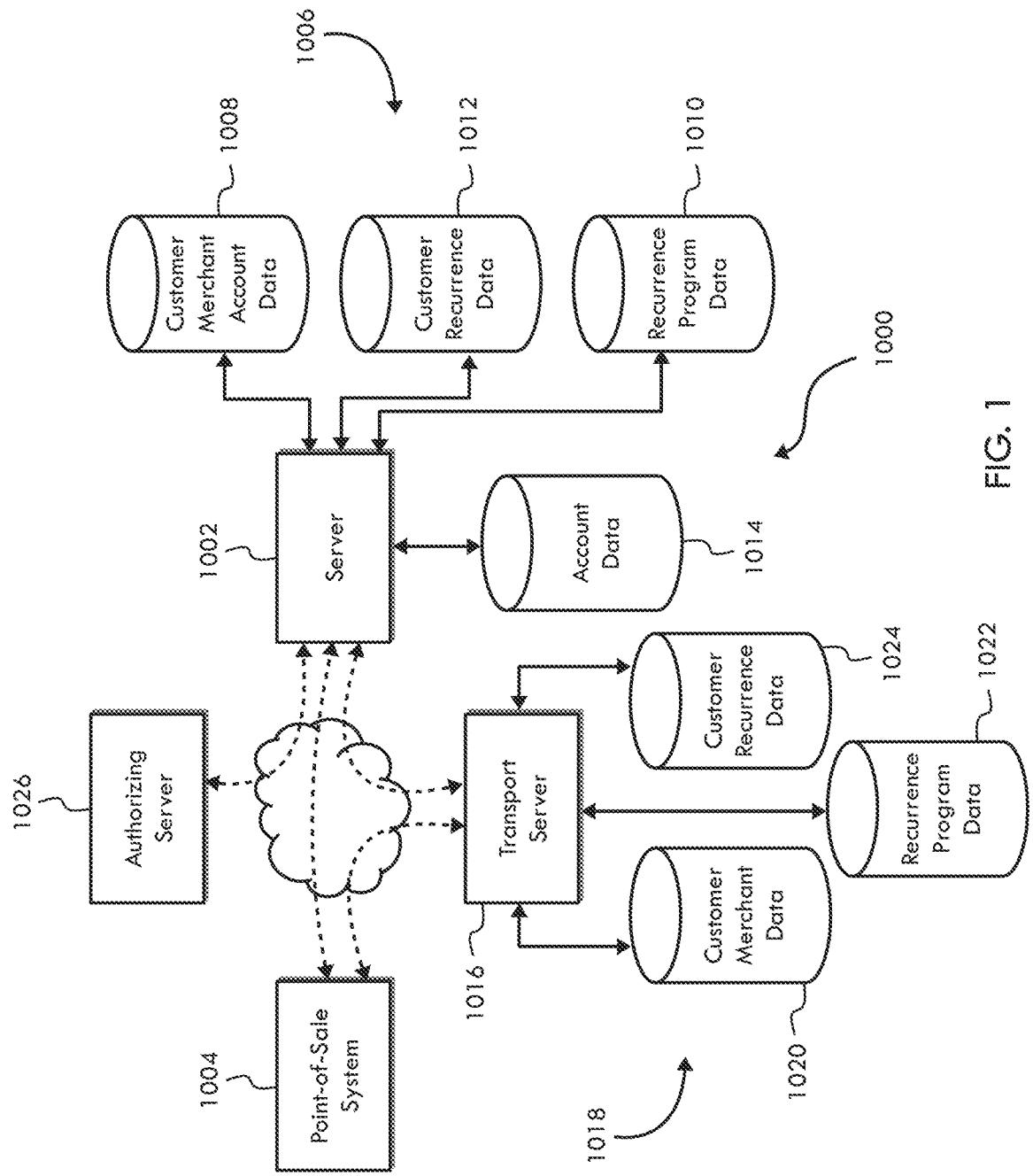
FIG. 1 is a schematic diagram of some non-limiting embodiments or aspects of a system for processing customer recurrence data for transactions according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Non-limiting embodiments or aspects of the present disclosure are directed to a system, method, and apparatus for processing customer recurrence data for transactions. Embodiments or aspects of the present disclosure provide the technological environment and infrastructure for implementing, managing, controlling, or otherwise processing customer recurrence data for transactions. Further embodiments or aspects of the present disclosure facilitate the processing, managing, or otherwise controlling of customer recurrence data for multiple customer recurrence programs for multiple merchants. Some or all of the specified customer recurrence data can be automatically transmitted to the merchant at the point-of-sale, whether before, during, or after a transaction, such as a transaction between a resource provider, e.g., a merchant, and a customer at or using a point-of-sale system. Still further, embodiments or aspects of the present disclosure use existing payment processing infrastructure and data flow to automatically adjust the transaction value or issue instructions to the point-of-sale system of the merchant before, during, or after the transaction between the merchant and the customer. In addition, the present disclosure provides the tools and systems that facilitate the effective implementation of a customer recurrence program for both merchants that have established and separately-managed or -controlled recurrence programs (e.g., external customer recurrence programs, which are primarily managed or controlled by a merchant) and merchants that may provide some general guidelines or rules, but do not have the infrastructure or capability to manage or control the recurrence program (e.g., internal customer recurrence programs, which require outside assistance for primary implementation, management, and control). In some examples, external customer recurrence programs may be utilized by small or mid-sized merchants that do not have the infrastructure to host and manage their own programs. Such external customer recurrence programs may be offered to the merchants at a charge or gratuitously. For example, the transaction service provider may provide external customer recurrence programs through the system described herein as an added service or for a fee (e.g., a subscription or percentage of sales). In this manner, the merchant is able to maintain or have maintained a customer recurrence program that benefits both parties at the point-of-sale and leverages and improves established technological infrastructure and data flow throughout the transactional system.

Referring now to FIG. 1, illustrated is some non-limiting embodiments or aspects of a system 1000 for processing customer recurrence data for transactions between a resource provider, e.g., a merchant, and a user, e.g., a customer. As shown in FIG. 1, and in this non-limiting embodiment or aspect, the system 1000 includes multiple communicating servers in a network environment, where these servers include, have access to, or otherwise communicate with one or more storage media, such as a database or the like.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Accordingly, and with reference to the non-limiting embodiment or aspect of FIG. 1, the depicted "Authorizing Server," "Server," and "Transport Server" all refer to a server-based system that may be owned or operated by a specific entity or group of entities. Further, multiple computers, e.g., servers, or other computerized devices, e.g., point-of-sale devices, directly or indirectly communicating in the network environment may constitute a "system," such as a merchant's point-of-sale system.

As used herein, the term "issuer bank" may refer to one or more entities that provide accounts to customers for conducting payment transactions, such as initiating credit and/or debit payments. For example, an issuer bank may provide an account identifier, such as a primary account number (PAN), to customers that uniquely identifies one or more accounts associated with that customer. The account identifier may be embodied on a physical financial instrument, such as a payment card, and/or may be electronic and used for electronic payments. As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. The terms "issuer bank" and "authorizing server" may also refer to one or more computer systems operated by or on behalf of an issuer bank, such as a server executing one or more software applications.

As used herein, the term "transport server" may refer to one or more computer systems that act as an intermediary between the point-of-sale system and another system or server, such as a transaction processing server, e.g., VisaNet. In one example, the "transport server" represents the computer systems of an acquirer (which is the bank operating as the merchant bank), and in another example, the "transport server" represents the computer systems of a third-party, such as a data warehouse, repository, cloud-based system, and/or the like.

As used herein, the term "resource provider" or "merchant" may refer to an individual or entity that provides goods and/or services, or access to goods and/or services, to users or customers based on a transaction, such as a payment transaction. A "point-of-sale system" or "POS system" refers to one or more computers and/or peripheral devices used by a merchant to engage in payment transactions with customers, including one or more card readers, near-field communication (NFC) devices and/or other contactless transceivers or receivers, payment terminals, computers, servers, input devices, and/or other like devices that can be used to initiate a payment transaction. A merchant POS system may also include one or more servers programmed or configured to process online payment transactions through webpages, mobile applications, and/or the like. A merchant POS system may also refer to one or more computer systems operated by or on behalf of a merchant, e.g., a merchant system, which may include one or more servers executing one or more software applications.

As used herein, the term "mobile device" may refer to one or more portable electronic devices that are configured to directly or indirectly communicate with one or more networks. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. Furthermore, the term "computer" may refer to any computing device that includes the necessary components to receive, process, and output data, and normally includes a display, a processor, a memory, an input device, and a network interface, and the term "server" may refer to a computer or cluster of computers that facilitate data communication in a network environment. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.). As used herein, the term "database" may refer to one or more data structures including specified data, such as customer merchant account data, customer recurrence data, recurrence program data, customer merchant data, and/or the like. Such a database may be part of a larger system database or, in other examples, may be one or more separate databases. Moreover, such databases may be stored on one or more data storage devices.

With reference to FIG. 1, and in some non-limiting embodiments or aspects, the system 1000 includes a server 1002, such as a transaction processing server (or system), e.g., VisaNet, which includes one or more computers, processors, storage devices, network interfaces, and executable instructions or code in the form of applications, APIs, software, firmware, code modules and the like operating in a network environment. When a user engages or initiates a transaction with a merchant at a point-of-sale, he or she will interact with a point-of-sale system 1004, e.g., using a credit card, payment device, and/or mobile device to interact either directly or indirectly with a reader device communicating as or within the point-of-sale system 1004.

Once the transaction or interaction is initiated, the server 1002 is programmed or configured to implement and/or execute specified steps of the method, including receiving, from the point-of-sale system 1004 of the specific merchant, an inquiry or request (e.g., a transaction authorization request) corresponding to an account identifier, such as all or a portion of a PAN, for a customer. This inquiry or request includes at least a merchant identifier for the merchant, such that the server 1002 can identify or determine information or data corresponding to the specified merchant. Similarly, the server 1002 utilizes the account identifier of the customer to determine whether the customer's account identifier corresponds to an existing customer merchant account associated with the merchant identifier in at least one database 1006, such as a customer merchant account database 1008, which includes information and data regarding an existing relationship, e.g., past transactions, between the customer and the merchant. If it is determined that the account identifier (which may be stored in a separate or integrated account database 1014) corresponds to an existing customer merchant account, the server 1002 is programmed or configured to transmit existing customer merchant account data from the customer merchant account database 1008 to the point-of-sale system 1004. Accordingly, the merchant is able to automatically identify and interact with the customer based upon the existence of a past relationship or transaction.

In addition, or alternatively, the server 1002 is programmed or configured to determine whether the merchant identifier corresponds to a customer recurrence program of or for the merchant. The data and information regarding the rules for and operation or implementation of the customer recurrence program is populated as recurrence program data in recurrence program database 1010. In response to determining that the merchant identifier corresponds to a customer recurrence program, the server 1002 then transmits customer recurrence data to the point-of-sale system 1004. This customer recurrence data may be stored on a customer recurrence database 1012, and the above-discussed recurrence program data may be part or a subset of the customer recurrence data.

With continued reference to FIG. 1, and in some non-limiting embodiments or aspects, the inquiry or request and merchant identifier are initially transmitted to a transport server 1016, which may be a bank or transaction system affiliated or associated with the merchant. However, it should be recognized that the transport server 1016 may be any third-party server or system that receives, processes, and/or forwards the inquiry or request and merchant identifier to the server 1002. In this embodiment, the transport server 1016 may include or be in communication with one or more databases 1018, such as customer merchant database 1020, which includes information and data related to the specified customer and/or merchant, a recurrence program database 1022, and/or a customer recurrence database 1024 (as discussed above in connection with the databases 1006). Further, and in this embodiment, the customer recurrence data that is provided to the point-of-sale system 1004 may be sent directly back to the point-of-sale system 1004, or, alternatively, included or integrated with a response (e.g., an authorization response) that is received from or through the server 1002, such as a transaction processing server or system.

In some non-limiting embodiments or aspects, the transport server 1016 (and/or a component of the point-of-sale system 1004) is the primary controller and manager of the various aspects of the customer recurrence program, such as the server or system of a larger merchant (e.g., a merchant having an external customer recurrence program). In this embodiment, the transport server 1016 (and/or the component of the point-of-sale system 1004) may locally determine the customer recurrence data and implement the rules of the customer recurrence program, such as the application of a discount to the transaction. Accordingly, the transactional data and information that is provided to the server 1002, such as a transaction processing server (e.g., VisaNet), may be modified prior to transmission to the server. Similarly, the customer recurrence data, e.g., a message to provide some benefit to the customer at the point-of-sale, may be appended to or included with the transactional data received from the server 1002, e.g., a transaction response message that approves the transaction between the merchant and the customer. In some non-limiting embodiments or aspects, the server 1002 is the primary controller and manager of the various aspects of the internal customer recurrence program, such that the merchant does not need to implement, control, or manage their own program, which is instead managed at the server 1002, e.g., VisaNet. Accordingly, based upon rules provided by this merchant to the server 1002, all transactions between the merchant and the customer are monitored and the customer recurrence data generated by the server 1002 and provided to the merchant at the point-of-sale. This demonstrates that the presently-invented system 1000 and method are useful to any merchant that would like to create, implement, and manage a customer recurrence program.

Some or all of the databases 1006, 1018 may be populated with the data for implementing the method and process of the presently-invented system 1000. In some non-limiting embodiments or aspects, at least a portion of the data in at least one of the databases 1006, 1018 includes multiple merchant identifiers each corresponding to a respective merchant or group of merchants (such as in databases 1008, 1020), multiple customer recurrence programs, e.g., the rules and definitions associated with each customer recurrence program (such as in databases 1010, 1022), multiple account identifiers associated with multiple customers (such as in database 1014), at least one customer merchant account associated with at least one account identifier (such as in databases 1008, 1020), and customer recurrence data associated with the at least one customer merchant account (such as in databases 1012, 1024). The customer recurrence program of the merchant or group of merchants may take a variety of forms and structures. For example, the customer recurrence program may be loyalty program, a club program, a rewards program, a branded credit account, and/or the like, and may be offered by a merchant, a group of associated merchants, a trade group, an industry group, an organization, a special interests group, a sports organization, and/or the like.

In some non-limiting embodiments or aspects, the customer recurrence data and/or the recurrence program data may include one or more of the following: (i) data indicating that the transaction is a first-time transaction involving the account identifier and the merchant identifier (e.g., a first-time customer at the merchant's brick-and-mortar location or online website or portal); (ii) frequency of transactions involving the account identifier and the merchant identifier (e.g., a number of visits or transactions at any one or collection of the specific merchant location, any merchant location, the merchant online website, a third-party online website, and/or the like); (iii) merchant data, such as merchant name, merchant location, merchant group, and/or merchant association; (iv) transaction data, such as previous transaction data, previous transaction amount, previous transaction frequency, time between a plurality of transactions, and/or transaction pattern data; and/or (v) customer recurrence program data, such as rule data (e.g., one or more rules that are used to set up or implement the customer recurrence program and further facilitate the initiation or operation of the program in an automated manner), offer data (e.g., a special offer to the customer), discount data (e.g., a discount that may be applied on the current transaction or a future transaction), benefit data (e.g., the provision of some benefit on or to the customer), gift data (e.g., a gift, such as a physical gift that may be provided to the customer at the point-of-sale), and/or donation data (e.g., an indication or request to make a donation to some other entity, such as a charity).

Further, and in some non-limiting embodiments or aspects, the server 1002 and/or transport server 1016 is programmed or configured to either automatically initiate, or provide an instruction to the merchant to initiate, an action at the point-of-sale based upon the customer recurrence data and/or recurrence program data. For example, a discount may be automatically applied to the current transaction between the merchant and the customer, with, optionally, a message being sent to the customer (such as on his or her mobile device) that such a discount has been provided based upon the customer recurrence data. In another example, the merchant may receive a message to provide the customer with a free gift of a specified value at the brick-and-mortar location, where this message would be automatically generated and transmitted to the merchant based upon the customer recurrence data and/or the recurrence program data. Many other similar variations are envisioned and deemed to be within the scope and context of the present disclosure.

In some non-limiting embodiments or aspects, and as illustrated in the process flow diagram of FIG. 2, an exemplary method or process 2000 will now be described as between the customer (C), the point-of-sale system 1004 (such as the merchant's portable financial device reader or online location), the transport server 1016 (such as the merchant's bank's system), the server 1002 (such as the transaction processing server of Visa), and an authorizing server 1026 (such as the issuer bank's system). In this example, in step (s1) the customer (C) informs or makes a request to the point-of-sale system 1004 at the point of sale, for example the customer (C) may select a number of items or services for purchase and inform the point-of-sale system 1004 that he or she is ready to "checkout" by selecting a checkout icon at an online location or presenting the items or service selection to an employee operating the point-of-sale system 1004. In step (s2), the point-of-sale system 1004 may receive the request from the customer (C) and generate transaction data to confirm with the customer (C). For example, the point-of-sale system 1004 may determine a transaction amount that may be shown on a display for the customer (C) to confirm. In step (s3), the point-of-sale system 1004 may communicate the transaction data to the customer (C) for verification or confirmation, and in step (s4), the customer (C) may transmit his or her credentials or account identifier to the point-of-sale system 1004 (e.g., swiping his or her portable financial device). For example, the customer (C) may possess a portable financial device storing account identifier information or data, such as a primary account number, and may transmit the information via near-field communications from the portable financial device to the point-of-sale system 1004, or insert his or her portable financial device into a reader of the point-of-sale system 1004. As discussed above, and in some non-limiting embodiments or aspects, the step (s1) would occur or be implemented based upon any interaction between the customer (C) and the point-of-sale system 1004 or request generated at the point-of-sale system 1004, such that an actual transaction request would not be generated. Instead, some message or communication would be generated at or by the point-of-sale system 1004 and transmitted to the transport server 1016 and/or server 1002 (as discussed above).

Figure 2:
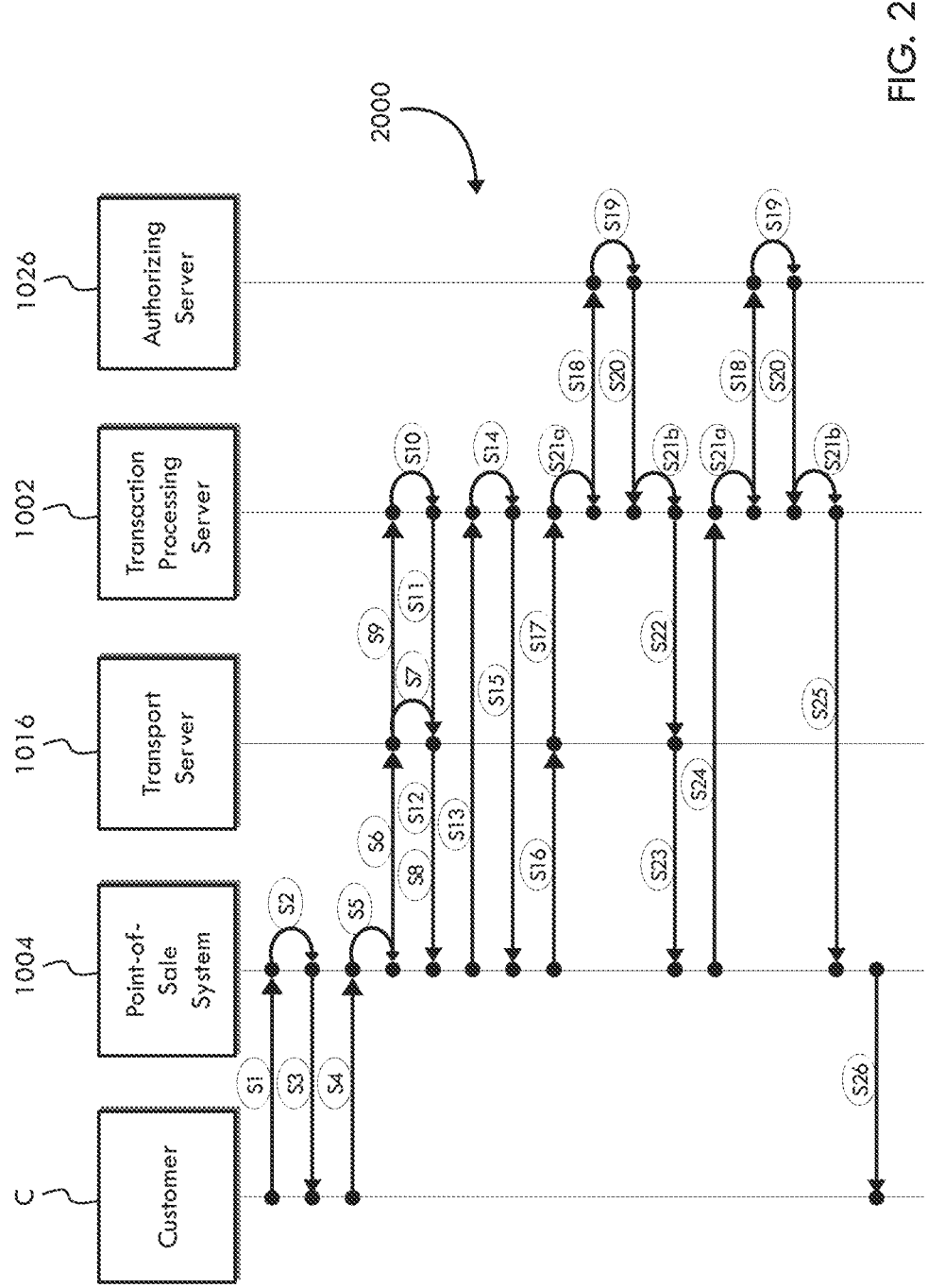
FIG. 2 is a process flow diagram of some non-limiting embodiments or aspects of a system for processing customer recurrence data for transactions according to the principles of the present disclosure.

With continued reference to FIG. 2, and in step (s5), the point-of-sale system 1004 may receive the credentials or account identifier of the customer (C) and generate an authorization request message that includes the transaction details, the customer's (C) account identifier, and the merchant identifier. In some non-limiting embodiments or aspects, and in step (s6), the authorization request message (e.g., the transaction details, the account identifier, and the merchant identifier) is transmitted to the transport server 1016, which, again, may be the merchant's bank, and in step (s7), the transport server 1016 uses the information in the databases 1018 to identify, generate and/or determine the desired customer recurrence data. As discussed above, the customer recurrence data and/or the recurrence program data may be configured by the merchant, such that the merchant receives the desired information regarding the customer (C) and his or her transaction history. Once identified, generated, and/or determined, the customer recurrence data, recurrence program data, and/or a message with instructions regarding an action to be implemented at the point-of-sale, is transmitted to the point-of-sale system 1004 in step (s8).

In some non-limiting embodiments or aspects, the authorization request message is forwarded by the transport server 1016 to the transaction processing server 1002, as illustrated in step (s9). In this embodiment, it is the server 1002, using the databases 1006, that identifies, generates, and/or determines the desired customer recurrence data at step (s10), and once identified, generated, and/or determined, transmits the customer recurrence data, recurrence program data, and/or a message with instructions regarding an action to be implemented at the point-of-sale through the transport server 1016 (step (s11)) to the point-of-sale system 1004 (step (s12)). However, in some non-limiting embodiments or aspects where the transport server 1016 is not utilized, the authorization request message is transmitted from the point-of-sale system 1004 directly to the transaction processing server 1002 in step (s13), the identification, generation, and/or determination is processed by the transaction processing server in step (s14), and the data or message is transmitted directly from the transaction processing server 1002 to the point-of-sale system 1004 in step (s15).

In some non-limiting embodiments or aspects, the authorization request message is transmitted from the point-of-sale system 1004 in step (s16), forwarded to the transaction processing server 1002 in step (s17), and from the transaction processing server 1002 to an authorizing server 1026 in step (s18). As discussed, this authorizing server 1026 may be the issuer bank system that issued the portable financial device to the customer (C). In step (s19), the authorizing server 1026 processes the request, such as by confirming, verifying, or otherwise authorizing the transaction and generating an authorization response message, which is transmitted to the transaction processing server 1002 in step (s20). In this embodiment, the transaction processing server 1002 appends or otherwise identifies, generates, and/or determines the customer recurrence data (either before (step (s21a)) or after (step (s21b)) communication with the authorizing server 1026). This authorization response message, including the customer recurrence data, recurrence program data, and/or a message with instructions regarding an action to be implemented at the point-of-sale, is then transmitted through the transport server 1016 in step (s22) to the point-of-sale system 1004 in step (s23). In addition, it should be noted that the transaction details, such as the application of a discount, may be modified prior to transmission of the authorization request message from the transaction processing server 1002 to the authorizing server 1026 in step (s18), which, in this example, would execute step (s21*a*) prior to step (s18). Accordingly, the transaction value would be modified in the transaction details for presentation to the customer (C) at the point of sale and effective for that specific transaction.

In some non-limiting embodiments or aspects, and with continued reference to FIG. 2, the transport server 1016 is not used, such that the authorization request message is transmitted directly from the point-of-sale system 1004 to the transaction processing server 1002 in step (s24) with the authorization response message and customer recurrence data, recurrence program data, and/or instructional message transmitted directly from the transaction processing server 1002 to the point-of-sale system 1004 in step (s25). In this embodiment, the above-described steps (s21*a*), (s18), (s19), (s20), and (s21*b*) would be implemented or processed as described. Finally, in step (s26), the point-of-sale system 1004 (or the merchant) interacts with the customer (C), such as by declining the transaction, e.g., insufficient funds in the customer's account, authorizing the transaction with a modified transaction amount, e.g., discount, and/or provide or cause to be provided a message, gift, offer, donation confirmation, and/or the like to the customer (C). In this manner, the both the customer and the merchant experience a seamless and automatic transactional experience at the point-of-sale without requiring additional (and often time-consuming) actions.

Figure 3:
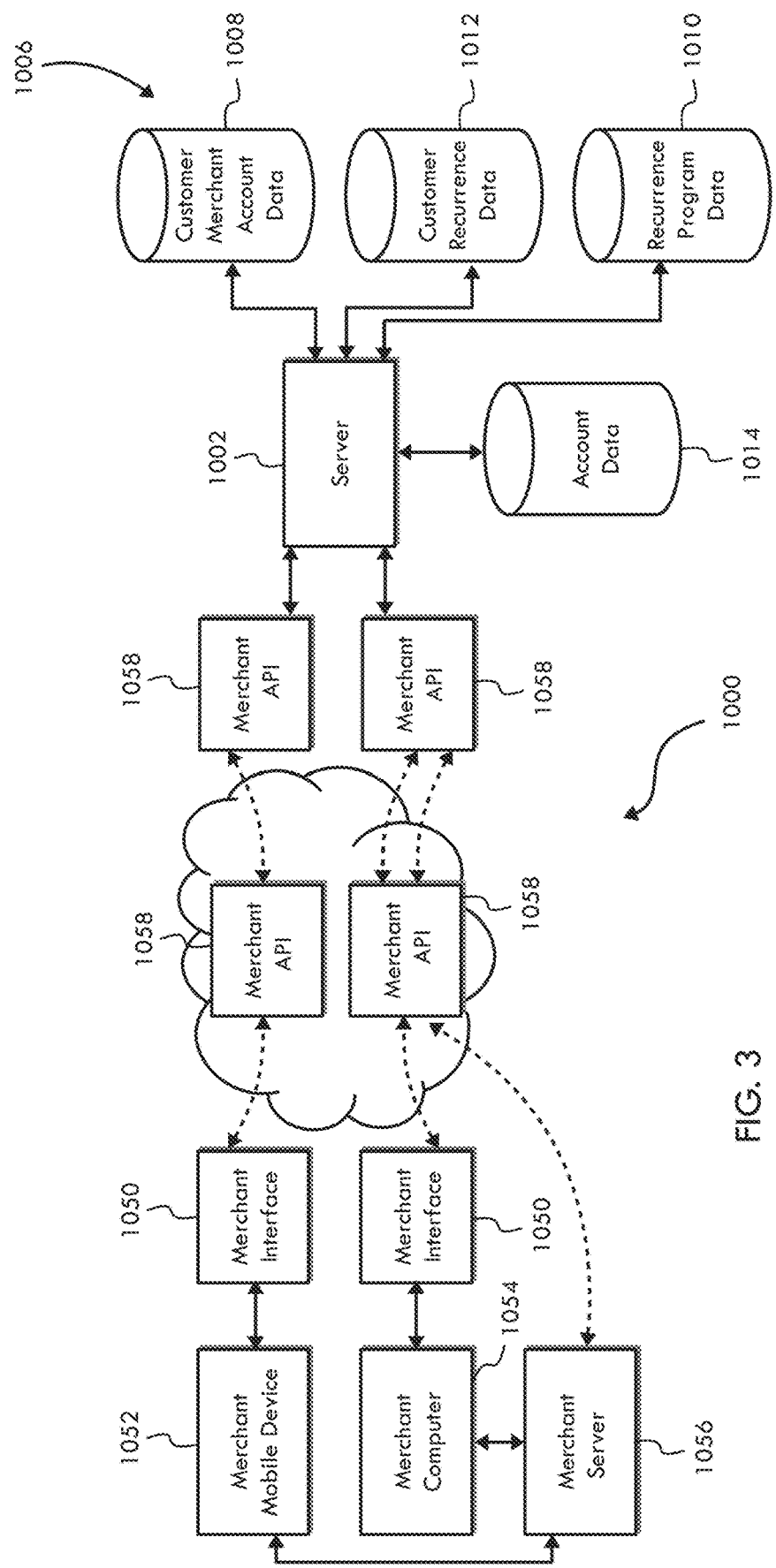
FIG. 3 is a schematic diagram of some non-limiting embodiments or aspects of a system for processing customer recurrence data for transactions according to the principles of the present disclosure.

In some non-limiting embodiments or aspects, and with reference to FIG. 3, the system 1000 includes at least one interface 1050 that is accessible by merchants. This merchant interface 1050 may be in the form of a graphical user interface (GUI) that is generated on or through a merchant mobile device 1052, a merchant computer 1054, and/or a merchant server 1056 (e.g., a merchant point-of-sale system 1004). Through the use of one or more merchant application programming interfaces (APIs) 1058, which may be provided or stored locally on the merchant mobile device 1052, merchant computer 1054, or merchant server 1056, in the network, or remotely on the server 1002 (or transport server 1016), the interface 1050 is programmed or configured to facilitate merchant input of customer recurrence program data, which may include customer data, merchant data, account identifier data, customer recurrence data, rule data, offer data, discount data, benefit data, gift data, and/or donation data. Accordingly, this interface 1050 may be used by the merchant to input data or information directed to the merchant's customer recurrence program, and some or all of this customer recurrence program data may be stored on the at least one database 1006 accessible by the server 1002.

In one example, the merchant may use the interface 1050 to set up or modify the customer recurrence program by inputting the rules for the automated implementation of the program. In another example, the merchant may provide the initial customer recurrence data to the server 1002 indicating data and information about past customers or new information about a specific customer or group of customers. Further, it is envisioned that this interface 1050 may include templates of existing customer recurrence programs, instructions regarding the building and managing of such a program, selectable options that facilitate data input and modification, and/or the like. The merchant may log in or otherwise access the interface 1050 through, for example, a web-based application including one or more graphical user interfaces (GUIs). The GUIs may include one or more selectable options, such as buttons, radio buttons, checkboxes, input boxes, drop-down menus, and/or the like, for creating and/or managing the customer recurrence program. Using the GUIs and selectable options, the merchant may create and/or modify any aspect of the program, and, in some embodiments, one or more rules files may be uploaded by the merchant to the server 1002 or, in other examples, the server 1002 may generate one or more rules files based on data received from the merchant through the GUIs. It will be appreciated that various other arrangements are possible. Accordingly, the interface 1050 facilitates the easy and effective management of the merchant's customer recurrence program with the automatic implementation thereof throughout the life of the program.

Figure 4:
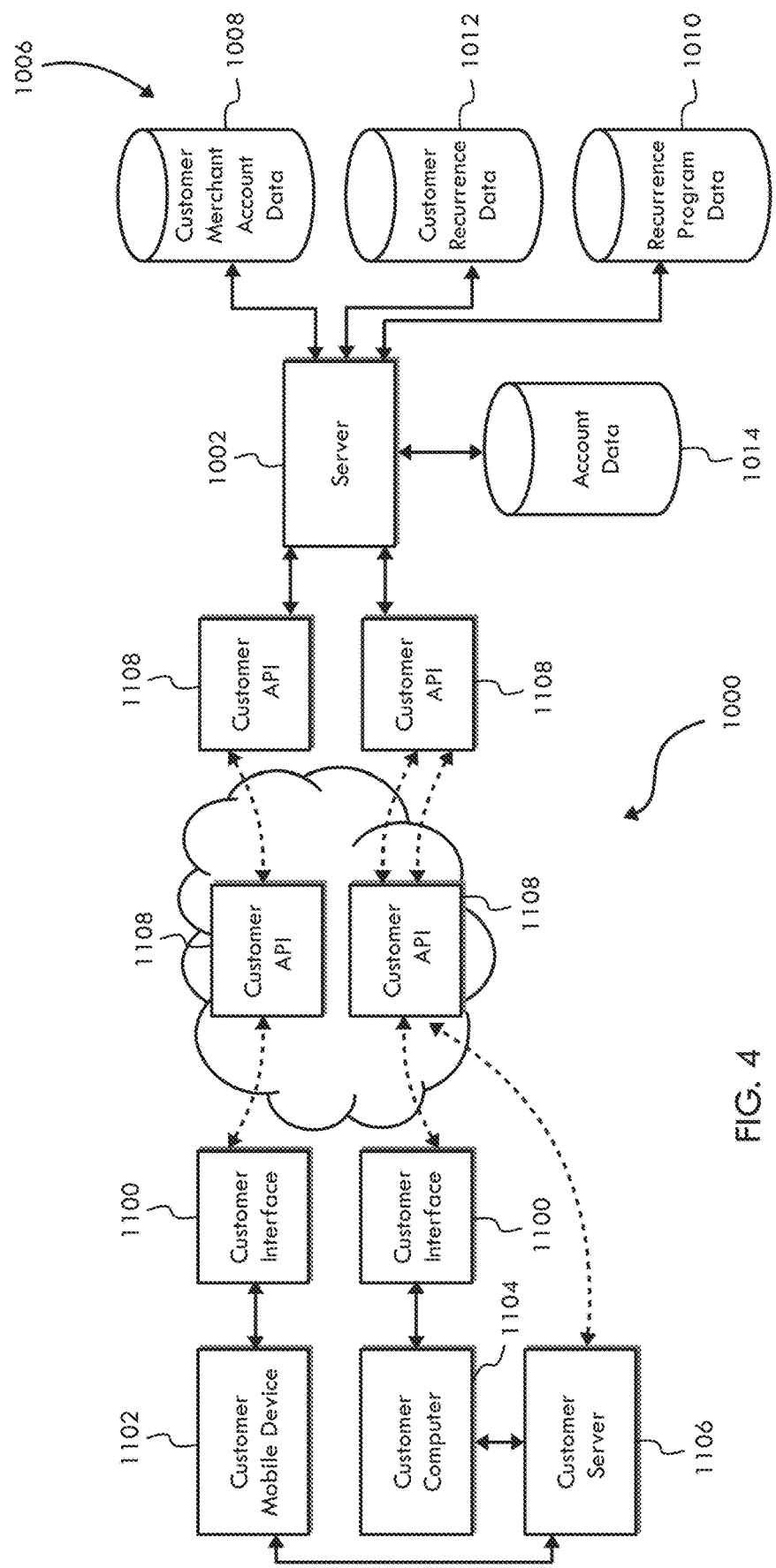
FIG. 4 is a schematic diagram of some non-limiting embodiments or aspects of a system for processing customer recurrence data for transactions according to the principles of the present disclosure.

In some non-limiting embodiments or aspects, and with reference to FIG. 4, the system 1000 includes at least one customer user interface 1100 that is accessible by customers. This customer user interface 1100 may be in the form of a graphical user interface (GUI) that is generated on or through a customer mobile device 1102, a customer computer 1104, and/or a customer server 1106. Through the use of one or more customer application programming interfaces (APIs) 1108, which may be provided or stored locally on the customer mobile device 1102, customer computer 1104, or customer server 1106, in the network, or remotely on the server 1002 (or transport server 1016), the customer user interface 1100 is programmed or configured to facilitate customer input of customer recurrence program data, customer recurrence data, merchant data, and/or account identifier data. The customer may log in or otherwise access the customer user interface 1100 through, for example, a web-based application including one or more graphical user interfaces (GUIs). The GUIs may include one or more selectable options, such as buttons, radio buttons, checkboxes, input boxes, drop-down menus, and/or the like, for identifying, joining, managing the customer's experience with one or more customer recurrence programs. Using the GUIs and selectable options, the customer may identify, interact with, or otherwise manage one or more customer recurrence programs of one or more merchants. It will be appreciated that various other arrangements are possible. Accordingly, this user interface 1100 may be used by the customer to input data or information directed to a selection of a new or existing customer recurrence program, current or past transactions with specified merchants, a selection of specified merchants or available customer recurrence programs, and/or information regarding the customer's payment mechanism, e.g., a personal account number, a credit card number, a debit card number, a portable financial device identifier, and/or the like, and some or all of this customer input may be stored on the at least one database 1006 accessible by the server 1002. Accordingly, the user interface 1100 facilitates the easy and effective interaction with the customer with one or more merchant customer recurrence programs.

In some non-limiting embodiments or aspects, the at least one interface 1050 includes or is programmed or configured to generate a display to the at least one customer comprising available customer recurrence programs corresponding to the customer's account identifier. In one example, and based upon customer and/or merchant data, the customer may be presented with multiple customer recurrence programs that may fit or be tailored to that specific customer (or group of customers including the specific customer). Accordingly, this display may be generated based upon at least one of the following: the location of the merchant (e.g., the brick-and-mortar location of the merchant in a specific community with the target customer), the location of the customer (e.g., the proximity of the customer to each merchant that is offering a customer recurrence program), customer data (e.g., information or data associated with the customer, such as the customer demographic, income, past transaction history, projected transactions, and/or the like), account identifier data (e.g., information or data associated with the specified account identifier data, which may include multiple people associated with a single account identifier), transaction data (e.g., information or data associated with past or future transactions), merchant data (e.g., information or data associated with a particular merchant that may represent a good fit with the customer), and/or the like.

In some non-limiting embodiments or aspects, the at least one user interface 1100 includes or is programmed or configured to display at least one of the following: a search input for identifying at least one merchant, such as the identification of desired merchants with which the customer wishes to interact; a location indicator identifying at least one merchant; a location indicator identifying a location of the at least one customer; an input for receiving customer recurrence program data; an acceptance indicator, such as an interface or input that facilitates the selection and/or confirmation that the customer would like to join a merchant's customer recurrence program; and/or the like.

Figure 5:
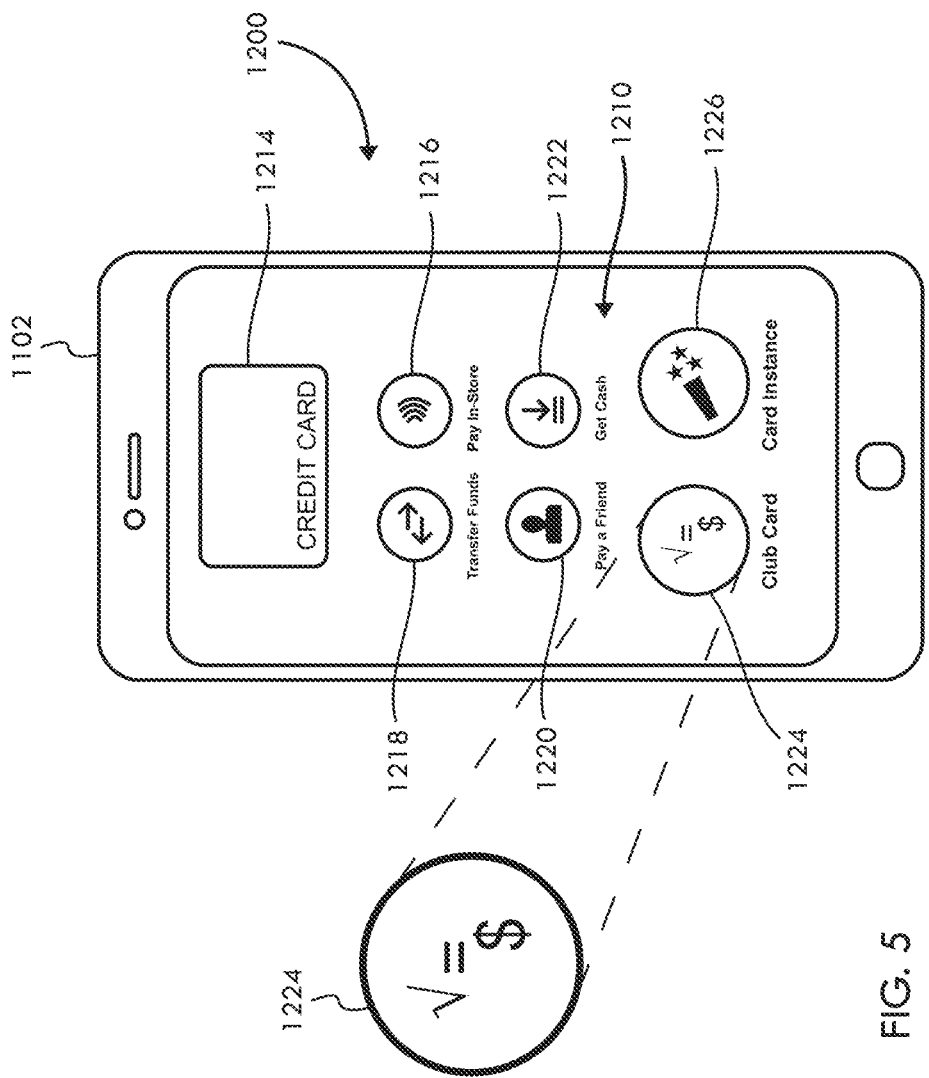
FIG. 5 is an exemplary interface for use in some non-limiting embodiments or aspects of a system for processing customer recurrence data for transactions according to the principles of the present disclosure.

With reference to FIG. 5, one exemplary interface 1200 is illustrated, which includes multiple selectable icons 1210, as displayed on the screen of a customer mobile device 1102. As shown in this embodiment or example, the interface 1200 includes an account icon 1214, which may display a representation the customer's portable financial device, e.g., a credit card, a payment icon 1216 for facilitating a transaction with the merchant at the point-of-sale, a transfer icon 1218 for facilitating the transfer of funds to or from the customer's account, a pay icon 1220 for facilitating the payment of other users in the account network, a cash icon 1222 for interacting with a merchant to provide cash to the customer based upon a transaction with the customer's account, a club card icon 1224 that facilitates interaction with certain functions or features of the customer user interface 1100 (as discussed above), and a card instance icon 1226 that facilitates interaction with other functions or features of the customer user interface 1100 (as discussed above). In one example, the last four digits of the customer PAN are populated on or as the account icon 1214, and, optionally, a search box is provided for the customer to search or identify specific merchant name, type, and/or category, and a map icon (not shown) to generate a map that geo-locates the customer's mobile device 1102 and displays or identifies merchants that are near the customer and are offering a customer recurrence program. Using the club card icon 1224, the customer may be prompted to input the customer's telephone number, loyalty number, and/or other information or data that will permit the creation or identification of an existing customer recurrence program. In this manner, the customer may input his or her existing recurrence program information, such that the system 1000 can automatically implement and manage the customer recurrence programs from both a customer perspective and a participating merchant's perspective. In addition, and as discussed above, the customer may be permitted to positively indicate his or her acceptance to a specific merchant customer recurrence program and/or the management of the program by a third party, such as a transaction processing entity, e.g., Visa.

Figure 6:
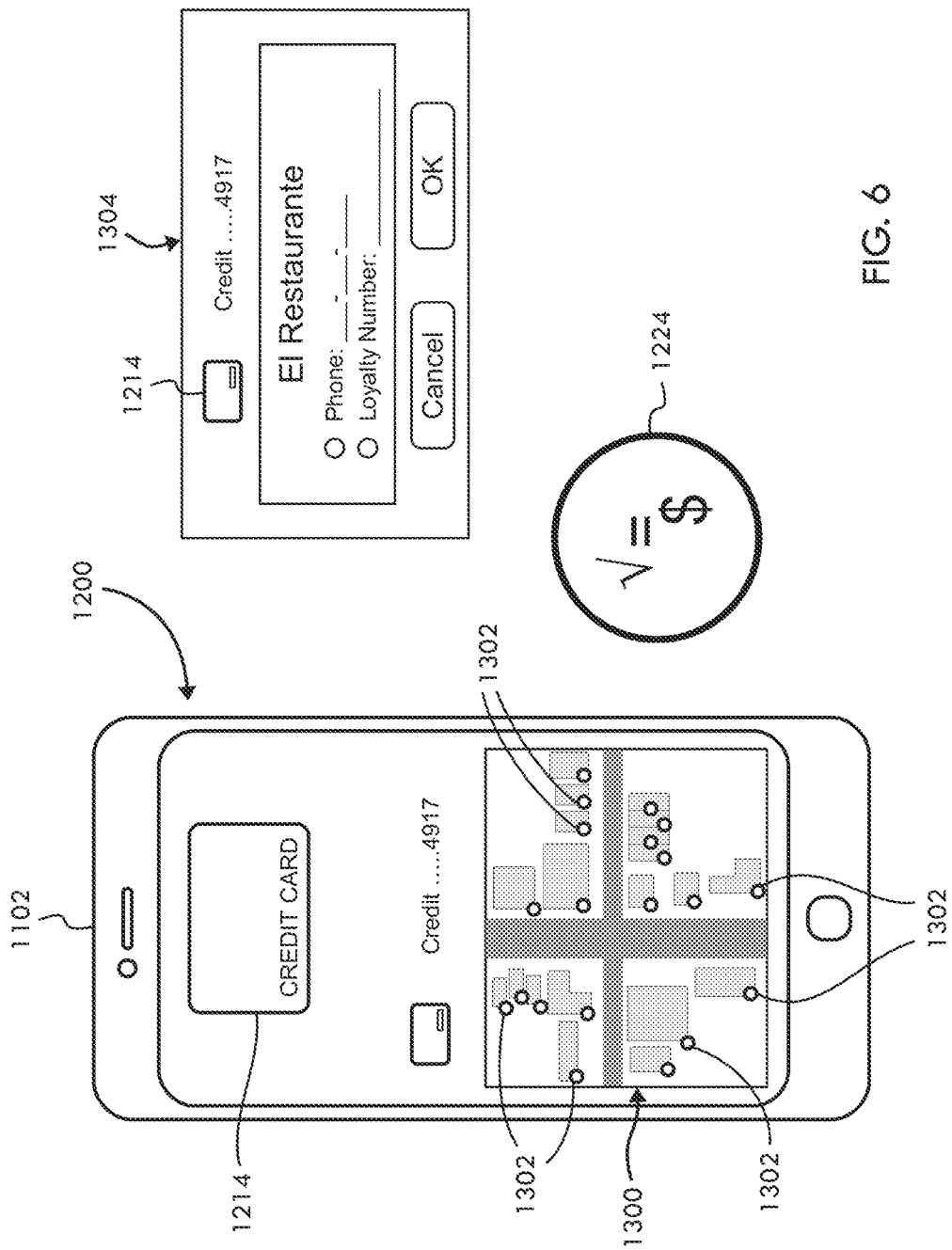
FIG. 6 is an exemplary interface for use in some non-limiting embodiments or aspects of a system for processing customer recurrence data for transactions according to the principles of the present disclosure.

With reference to FIG. 6, upon selection of the club card icon 1224, the interface 1200 may display a map 1300 that includes a representative map of the area or environment around the customer and having one or more merchant icons 1302 that represent participating merchants (e.g., merchants having a customer recurrence program) that are near the customer's location. Upon selection of a specific merchant icon 1302, an interface 1304 is generated or displayed that includes the account icon 1214, a portion of the customer's personal account number, and an area to input the customer's telephone number and a loyalty number for a specific customer recurrence program. This facilitates the identification and interaction with the program of the merchant.

Figure 7:
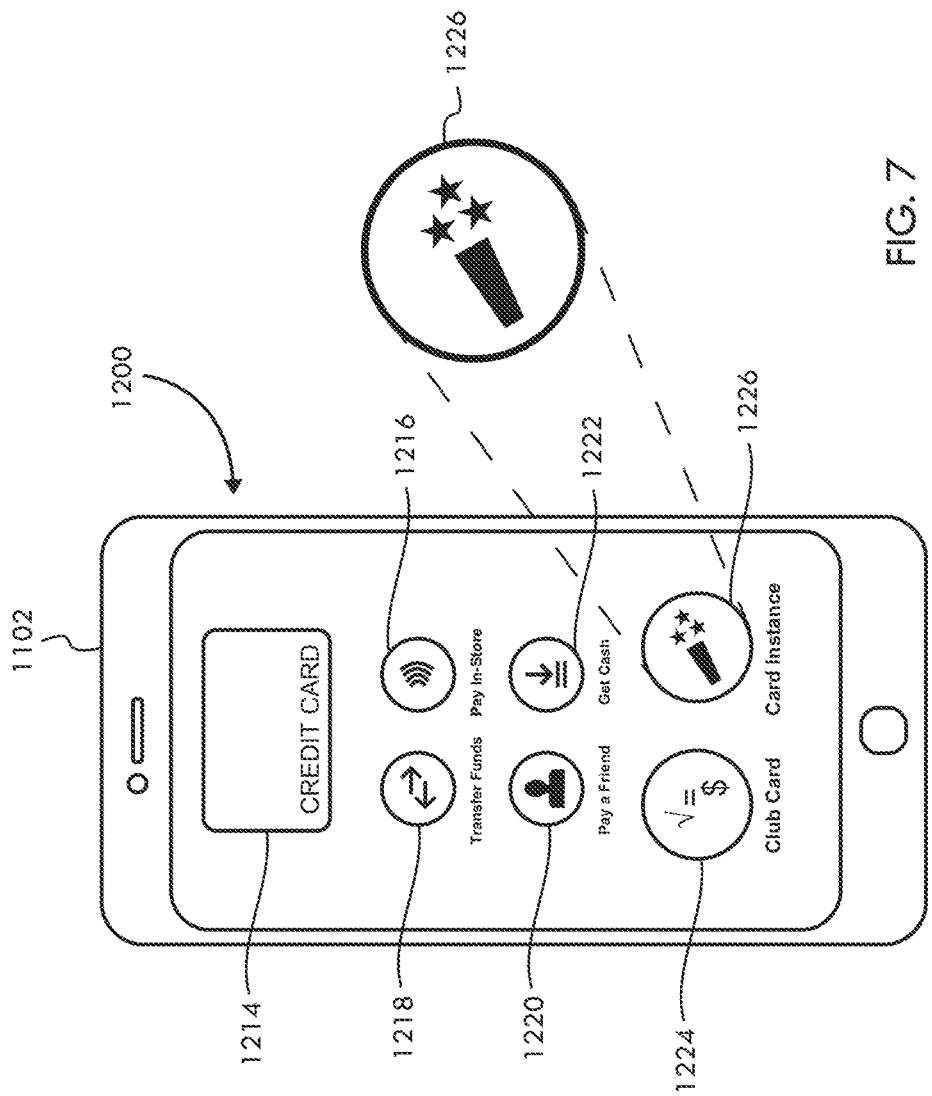
FIG. 7 is an exemplary interface for use in some non-limiting embodiments or aspects of a system for processing customer recurrence data for transactions according to the principles of the present disclosure.
Figure 8:
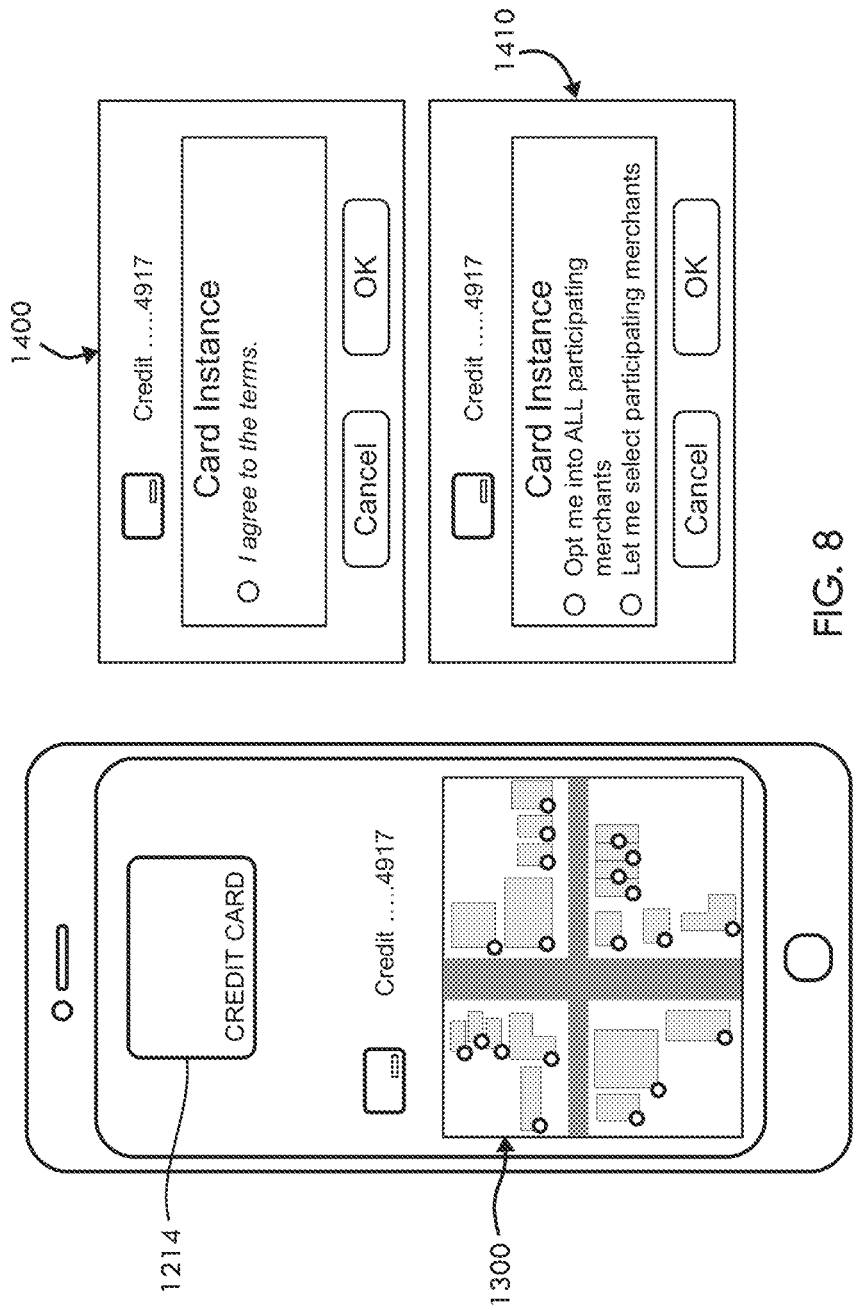
FIG. 8 is an exemplary interface for use in some non-limiting embodiments or aspects of a system for processing customer recurrence data for transactions according to the principles of the present disclosure.

The customer may also select the card instance icon 1226 (as shown on FIG. 7), which may then display the above-discussed account icon 1214 and map icon 1300, as well as an acceptance interface 1400 (shown in FIG. 8) that is programmed or configured to facilitate the acceptance of the customer to be involved or participate in the card instance program, e.g., a program that is implemented across multiple merchants and provides certain instant feedback or benefit to the customer at the point of sale of one or more merchants. In this embodiment, and upon acceptance of the customer to be involved in the program, an interface 1410 (shown in FIG. 8) may be displayed, which permits the customer to select to be involved in all available customer recurrence programs or, alternatively, select specific merchants.

As discussed above, the customer recurrence data that is transmitted to the point-of-sale system 1004 may include one or more messages for the merchant to implement one or more actions. For example, the message may include: an instruction based upon a rule associated with the customer recurrence program, an instruction to make an offer, an instruction to provide a discount, an instruction to provide a benefit, an instruction to provide a gift, an instruction to initiate a separate transaction, and/or the like. In addition, all or a portion of the customer recurrence data is transmitted (i) prior to the transaction, (ii) during any stage of the transaction, and/or (iii) after the transaction.

In some non-limiting embodiments or aspects, the present disclosure is directed to a computer-implemented method for processing transaction requests from a plurality of point-of-sale systems 1004 associated with a plurality of merchants, comprising: (a) receiving, from a mobile device 1102 or computer 1104, 1106 operated by a customer, existing customer merchant account data for at least one existing customer merchant account associated with at least one merchant of the plurality of merchants; (b) associating, in at least one database 1006, 1018, the existing customer merchant account data with an account identifier of the customer; (c) receiving, from a point-of-sale system 1004 of the plurality of point-of-sale systems 1004, a transaction request comprising a merchant identifier and at least a portion of the account identifier or an associated account identifier; (d) determining, with at least one processor, whether the portion of the account identifier or associated account identifier corresponds to the existing customer merchant account for the merchant; and (e) in response to determining that the portion of the account identifier or associated account identifier corresponds to the existing customer merchant account, transmitting at least a portion of the existing customer merchant account data to the point-of-sale system 1004.

In some non-limiting embodiments or aspects, the present disclosure provides a computer-implemented method for processing transaction requests from a plurality of point-of-sale systems 1004 associated with a plurality of merchants, comprising: (a) receiving, from each of the plurality of merchants, at least one customer recurrence rule associated with a merchant customer recurrence program; (b) receiving, from a customer, authorization to opt-in to at least one merchant customer recurrence program; (c) in response to receiving the authorization, associating an account identifier of the customer with the at least one merchant customer recurrence program in at least one database 1006, 1018; (d) receiving, from a point-of-sale system 1004 of the plurality of point-of-sale systems 1004, a transaction request comprising a merchant identifier for a merchant of the plurality of merchants and at least a portion of the account identifier or an associated account identifier; (e) determining whether the portion of the account identifier or associated account identifier corresponds to a merchant customer recurrence program for the merchant in the at least one database 1006, 1018; (f) in response to determining that the account identifier corresponds to the merchant customer recurrence program, generating customer recurrence data based at least partially on the at least one customer recurrence rule; and (g) transmitting at least a portion of the customer recurrence data to the point-of-sale system 1004.

Figure 9:
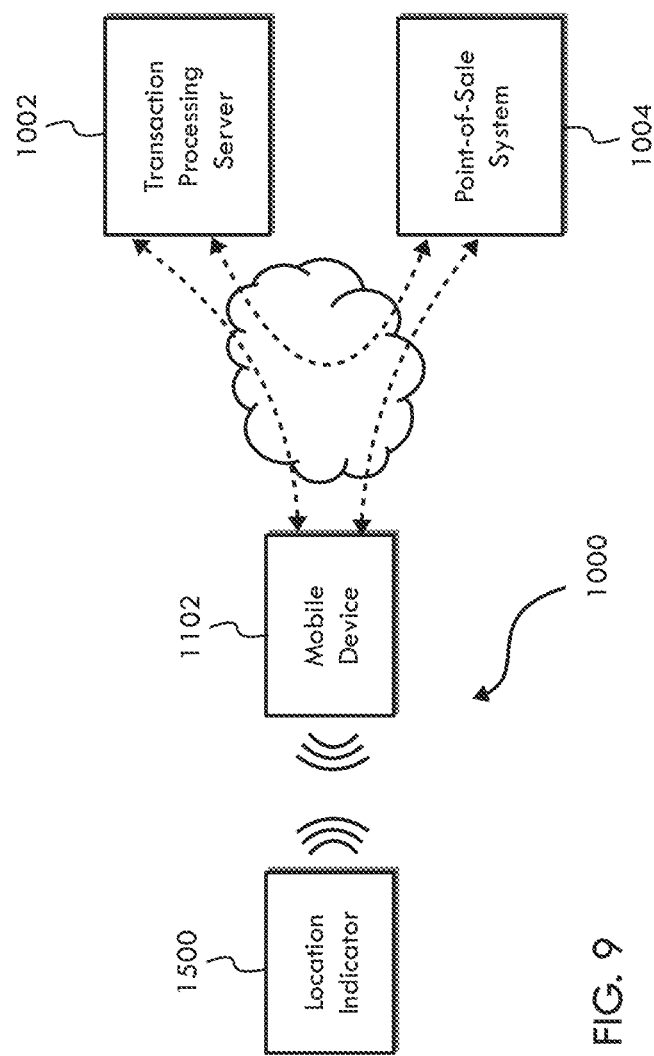
FIG. 9 is a schematic diagram of some non-limiting embodiments or aspects of a system for processing customer recurrence data for transactions according to the principles of the present disclosure.

In some non-limiting embodiments or aspects, and as illustrated in FIG. 9, the system 1000 includes one or more location indicators 1500 that are programmed or configured to interact or communicate with a customer mobile device 1102. For example, one or more location indicators 1500 may be provided or located in an area associated with multiple merchants, with a single merchant, with a group of merchants, in a mall area, and/or the like. Further, these location indicators may include passive or active systems that are programmed or configured to passively, actively, dynamically, directly, and/or indirectly interact with the customer mobile device 1102, merchant point-of-sale system 1004, transport server 1016, and/or server 1002, e.g., transaction processing server. Once a either the location indicator 1500 or customer mobile device 1102 determines a specified proximity with each other, a device or computer in the system 1000 determines an account identifier associated with the customer operating the customer mobile device 1102. Next, the system 1000 is programmed or configured to determine the existence of a new (e.g., available) or existing customer recurrence program of the customer based at least partially on the account identifier and at least one customer recurrence rule of at least one merchant. Finally, the system 1000 is programmed or configured to implement or enable the interaction or transaction between the customer and an existing customer recurrence program (e.g., a program in which the customer is already connected or associated with) or a customer and a new merchant, such as presenting an opt-in offer (to the customer recurrence program) to the customer mobile device 1102. Further, this location indicator 1500 may be in the form of at least one of the following: a beacon, a radio frequency identification device, a location system, a GPS device, a point-of-sale system 1004, such as a location-enabled device, and/or the like. In some non-limiting embodiments or aspects, the system 1000, such as the server 1002, is programmed or determined to identify or determine account data that is associated with the account identifier, which provides an integrated system between the merchant's customer recurrence program and the customer's payment device or account. This account data may include customer data, verification data, qualification data, transaction data, customer recurrence data, and/or the like, which would enable the system 1000 to determine eligibility, credit worthiness, qualification, and/or other information relevant to enrollment or interaction between the customer and the merchant.

In some non-limiting embodiments or aspects, the present disclosure is directed to a computer program product for processing transaction requests from a plurality of point-of-sale systems 1004 associated with a plurality of merchants, comprising at least one non-transitory computer-readable medium having program instructions stored thereon, which, when executed by at least one processor, causes the at least one processor to: (a) receive, from a mobile device 1102 or computer 1104, 1106 operated by a customer, existing customer merchant account data for at least one existing customer merchant account associated with at least one merchant of the plurality of merchants; (b) associate, in at least one database 1006, 1018, the existing customer merchant account data with an account identifier of the customer; (c) receive, from a point-of-sale system 1004 of the plurality of point-of-sale systems 1004, a transaction request comprising a merchant identifier and at least a portion of the account identifier or an associated account identifier; (d) determine, with at least one processor, whether the portion of the account identifier or associated account identifier corresponds to the existing customer merchant account for the merchant; and (e) in response to determining that the portion of the account identifier or associated account identifier corresponds to the existing customer merchant account, transmit at least a portion of the existing customer merchant account data to the point-of-sale system 1004.

In some non-limiting embodiments or aspects, the present disclosure is directed to a computer program product for processing transaction requests from a plurality of point-of-sale systems 1004 associated with a plurality of merchants, comprising at least one non-transitory computer-readable medium having program instructions stored thereon, which, when executed by at least one processor, causes the at least one processor to: (a) receive, from each of the plurality of merchants, at least one customer recurrence rule associated with a merchant customer recurrence program; (b) receive, from a customer, authorization to opt-in to at least one merchant customer recurrence program; (c) in response to receiving the authorization, associate an account identifier of the customer with the at least one merchant customer recurrence program in at least one database 1006, 1018; (d) receive, from a point-of-sale system 1004 of the plurality of point-of-sale systems 1004, a transaction request comprising a merchant identifier for a merchant of the plurality of merchants and at least a portion of the account identifier or an associated account identifier; (e) determine whether the portion of the account identifier or associated account identifier corresponds to a merchant customer recurrence program for the merchant in the at least one database 1006, 1018; (f) in response to determining that the account identifier corresponds to the merchant customer recurrence program, generate customer recurrence data based at least partially on the at least one customer recurrence rule; and (g) transmit at least a portion of the customer recurrence data to the point-of-sale system 1004.

In one example or implementation of the system 1000 and method of the present disclosure, a customer logs in to the customer user interface 1100 using her mobile device 1102 and inputs or provides information associated with her involvement with a customer recurrence program at merchant A and merchant B. This information is stored in one or more of the databases 1006 associated with the server 1002, such as the transaction processing server, e.g., VisaNet, and linked to the customer's account identifier, such as her primary account number (PAN) of her Visa credit card. The customer then visits a location of merchant A and purchases an item at the point of sale by presenting her credit card to or at the point-of-sale system 1004 of merchant A. As discussed above in connection with FIG. 2, and during the transaction process, the server 1002 processes the transaction, first determining that the customer is a recurring customer of merchant A and then applying the rules of merchant A's customer recurrence program (as provided to the server 1002 through the merchant interface 1050) to the specific transaction. In this example, the customer is eligible to receive a 5% discount on the current transaction, such that the server 1002 transmits an authorization request message to the authorizing server (e.g., the issuer bank system) with the 5% discount applied. Once authorization is received from the authorizing server 1026, the server 1002 transmits both the authorization response message and customer recurrence data back to the point-of-sale system 1004, which, in this case, includes the automated discount to the current transaction. The customer is made aware of this discount at the point of sale, such as through the receipt provided to her or a message displayed to her at the point of sale (or a message on her mobile device 1102). This demonstrates the automated and seamless nature of the process with respect to both the customer, who has availed herself of the customer recurrence program of merchant A, and the merchant, who did not need to manage this discount process manually at the point of sale.

In this manner, the system 1000 and method of the present disclosure provides a technical tool to assist merchants in implementing and managing a customer recurrence program on a transaction-by-transaction basis and across multiple, interacting platforms and systems. Further, this system 1000 and method facilitates the effective implementation, tracking, and management of merchant's customer recurrence programs, and permits the merchants to avoid the costs and time associated with managing and controlling their own customer recurrence program at each point-of-sale system 1004. In addition, this system 1000 and method facilitates the implementation of an established, preexisting customer recurrence program of a merchant (e.g., an external customer recurrence program), as well as the creation, implementation, and management of a customer recurrence program for a merchant (e.g., an internal customer recurrence program). Further, by centralizing the management and control of the customer recurrence program, such as at the transport server 1016 or server 1002, the transaction value may automatically adjust the transaction value according to the rules of each merchant's customer recurrence program according to their configurable rules and the existing customer recurrence data.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
   receiving an account identifier of a customer via at least one graphical user interface displayed on a customer device;
   communicating the account identifier to at least one server computer from the customer device via a customer application programming interface;
   generating, on the at least one graphical user interface of the customer device, a display comprising a plurality of merchants associated with a plurality of customer recurrence programs corresponding to the account identifier;
   generating a plurality of selectable options on at least one merchant graphical user interface on a merchant device;
   receiving rule data associated with a customer recurrence program of a merchant via the plurality of selectable options;
   communicating the rule data to the at least one server computer from the merchant device via a merchant application programming interface;
   in response to selection of a selectable option on the at least one graphical user interface, opting-in to a card instance program corresponding with at least a subset of the plurality of merchants by causing the at least one server computer to associate the account identifier with each merchant of the at least a subset of merchants in a database; and
   in response to a transaction request involving the account identifier, applying the rule data associated with the customer recurrence program of the merchant to a transaction.

2. The computer-implemented method of claim 1, wherein the display comprising the plurality of merchants is based on customer recurrence program data communicated from the at least one server computer to the customer device.

3. The computer-implemented method of claim 1, wherein the display is generated based at least partially on at least one of the following: a location of a merchant, a location of the customer, customer data, transaction data, merchant data, or any combination thereof.

4. The computer-implemented method of claim 1, further comprising:
   generating, on the at least one graphical user interface of the customer device, a display comprising a map interface comprising at least one merchant of the plurality of merchants displayed in a geographic area based on proximity to the customer device.

5. The computer-implemented method of claim 1, wherein the at least one merchant graphical user interface comprises a plurality of templates of customer recurrence programs, and wherein the rule data is based on a selected template from the plurality of templates.

6. The computer-implemented method of claim 1, further comprising:
   generating, on the at least one graphical user interface of the customer device, a display comprising at least the subset of the plurality of merchants associated with the account identifier in response to a selection of opting-in to the card instance program.

7. A system for implementing a method comprising at least one processor in communication with a server comprising:
   at least one processor programmed or configured to:
      receive an account identifier of a customer via at least one graphical user interface displayed on a customer device;

communicate the account identifier to at least one server computer from the customer device via a customer application programming interface;

generate, on the at least one graphical user interface of the customer device, a display comprising a plurality of merchants associated with a plurality of customer recurrence programs corresponding to the account identifier;

generate a plurality of selectable options on at least one merchant graphical user interface on a merchant device;

receive rule data associated with a customer recurrence program of a merchant via the plurality of selectable options;

communicate the rule data to the at least one server computer from the merchant device via a merchant application programming interface, in response to selection of a selectable option on the at least one graphical user interface, opt-in to a card instance program corresponding with at least a subset of the plurality of merchants by causing the at least one server computer to associate the account identifier with each merchant of the at least a subset of merchants in a database; and in response to a transaction request involving the account identifier, apply the rule data associated with the customer recurrence program of the merchant to a transaction.

8. The system of claim 7, wherein the display comprising the plurality of merchants is based on customer recurrence program data communicated from the at least one server computer to the customer device.

9. The system of claim 7, wherein the display is generated based at least partially on at least one of the following: a location of a merchant, a location of the customer, customer data, transaction data, merchant data, or any combination thereof.

10. The system of claim 7, the at least one processor further programmed or configured to:
generate, on the at least one graphical user interface of the customer device, a display comprising a map interface comprising at least one merchant of the plurality of merchants displayed in a geographic area based on proximity to the customer device.

11. The system of claim 7, wherein the at least one merchant graphical user interface comprises a plurality of templates of customer recurrence programs, and wherein the rule data is based on a selected template from the plurality of templates.

12. The system of claim 7, the at least one processor programmed or configured to:
generate, on the at least one graphical user interface of the customer device, a display comprising at least the subset of the plurality of merchants associated with the account identifier in response to a selection of opting-in to a card instance program.

13. A computer program product comprising at least one non-transitory computer-readable medium having program instructions stored thereon, which, when executed by at least one processor, causes the at least one processor to:

receive an account identifier of a customer via at least one graphical user interface displayed on a customer device;

communicate the account identifier to at least one server computer from the customer device via a customer application programming interface;

generate, on the at least one graphical user interface of the customer device, a display comprising a plurality of merchants associated with a plurality of customer recurrence programs corresponding to the account identifier;

generate a plurality of selectable options on at least one merchant graphical user interface on a merchant device;

receive rule data associated with a customer recurrence program of a merchant via the plurality of selectable options;

communicate the rule data to the at least one server computer from the merchant device via a merchant application programming interface;

in response to selection of a selectable option on the at least one graphical user interface, opt-in to a card instance program corresponding with at least a subset of the plurality of merchants by causing the at least one server computer to associate the account identifier with each merchant of the at least a subset of merchants in a database; and in response to a transaction request involving the account identifier, apply the rule data associated with the customer recurrence program of the merchant to a transaction.

14. The computer program product of claim 13, wherein the display comprising the plurality of merchants is based on customer recurrence program data communicated from the at least one server computer to the customer device.

15. The computer program product of claim 13, wherein the display is generated based at least partially on at least one of the following: a location of a merchant, a location of the customer, customer data, transaction data, merchant data, or any combination thereof.

16. The computer program product of claim 13, wherein the program instructions, when executed by the at least one processor, further cause the at least one processor to:
generate, on the at least one graphical user interface of the customer device, a display comprising a map interface comprising at least one merchant of the plurality of merchants displayed in a geographic area based on proximity to the customer device.

17. The computer program product of claim 13, wherein the at least one merchant graphical user interface comprises a plurality of templates of customer recurrence programs, and wherein the rule data is based on a selected template from the plurality of templates.

\* \* \* \* \*

UNITED STATES PATENT AND TRADEMARK OFFICE
CERTIFICATE OF CORRECTION

PATENT NO. : 12,321,914 B2
APPLICATION NO. : 17/947239
DATED : June 3, 2025
INVENTOR(S) : Gwen Diane Ma et al.

Page 1 of 1

It is certified that error appears in the above-identified patent and that said Letters Patent is hereby corrected as shown below:

In the Specification

Column 1, Line 9, delete "Apr. 12, 2017," and insert -- Oct. 8, 2019, --

Signed and Sealed this
Twenty-second Day of July, 2025

Coke Morgan Stewart
*Acting Director of the United States Patent and Trademark Office*